United States Patent [19]

Hatanaka

[11] Patent Number: 5,654,843
[45] Date of Patent: Aug. 5, 1997

[54] METHOD AND APPARATUS FOR FOLLOWING CURVED TRACKS ON A TAPE

[75] Inventor: Keiji Hatanaka, Nagaokakyo, Japan

[73] Assignee: Mitsubishi Denki Kabushiki Kaisha, Tokyo, Japan

[21] Appl. No.: 347,187

[22] Filed: Nov. 21, 1994

Related U.S. Application Data

[63] Continuation of Ser. No. 158,378, Nov. 29, 1993, abandoned, which is a continuation of Ser. No. 676,305, Mar. 28, 1991, abandoned.

[30] Foreign Application Priority Data

Apr. 3, 1990 [JP] Japan .................................. 2-89529
Apr. 3, 1990 [JP] Japan .................................. 2-89530

[51] Int. Cl.$^6$ .................................................. G11B 21/02
[52] U.S. Cl. .................................. 360/7.16; 360/77.13
[58] Field of Search ........................ 360/77.16, 77.17, 360/10.2, 77.13, 77.01, 77.07, 77.12, 77.06; 386/78, 79

[56] References Cited

U.S. PATENT DOCUMENTS

| 4,143,405 | 3/1979 | Kubota | 360/77.16 |
|---|---|---|---|
| 4,204,234 | 5/1980 | Noble | 360/77.06 |
| 4,410,918 | 10/1983 | Watanabe | 360/77.16 |
| 4,443,823 | 4/1984 | Sakamoto | 360/77 |
| 4,451,860 | 5/1984 | Honjo et al. | 360/77.16 |
| 4,520,410 | 5/1985 | Sekiguchi et al. | 360/77.13 |
| 4,688,109 | 8/1987 | Sangu | 360/77.16 |
| 4,825,311 | 4/1989 | Saito | 360/77.16 |
| 5,001,579 | 3/1991 | Compton | 360/77.06 |
| 5,097,365 | 3/1992 | Takahashi | 360/77.06 |
| 5,138,505 | 8/1992 | Nishijima et al. | 360/77.16 |
| 5,227,931 | 7/1993 | Misami | 360/77.06 |

FOREIGN PATENT DOCUMENTS

| 61-133010 | 6/1986 | Japan . |
|---|---|---|
| 63-21245 | 5/1988 | Japan . |
| 150967A | 2/1989 | Japan . |
| 150967 | 11/1989 | Japan . |
| 01185299 | 3/1991 | Japan . |
| 2235812 | 3/1991 | United Kingdom . |
| WO8606202 | 10/1986 | WIPO . |

Primary Examiner—Aristotelis M. Psitos
Assistant Examiner—Larry Cullen

[57] ABSTRACT

In a method for performing magnetic recording and reproducing an apparatus is used which includes a magnetic head carried by a piezo-electric movable element, the position of the magnetic head is detected such that reproduction signals are maximized within the range of transverse movement of the magnetic head, i.e., the range of less than ⅓ of the track width is detected. Their corresponding pattern signals are inputted as renewed successively. The result of this method is that a good reproduction image can be obtained even from a magnetic tape having locally different record levels, following any track curvature change with time, without deteriorating the quality of image during reproduction.

12 Claims, 15 Drawing Sheets

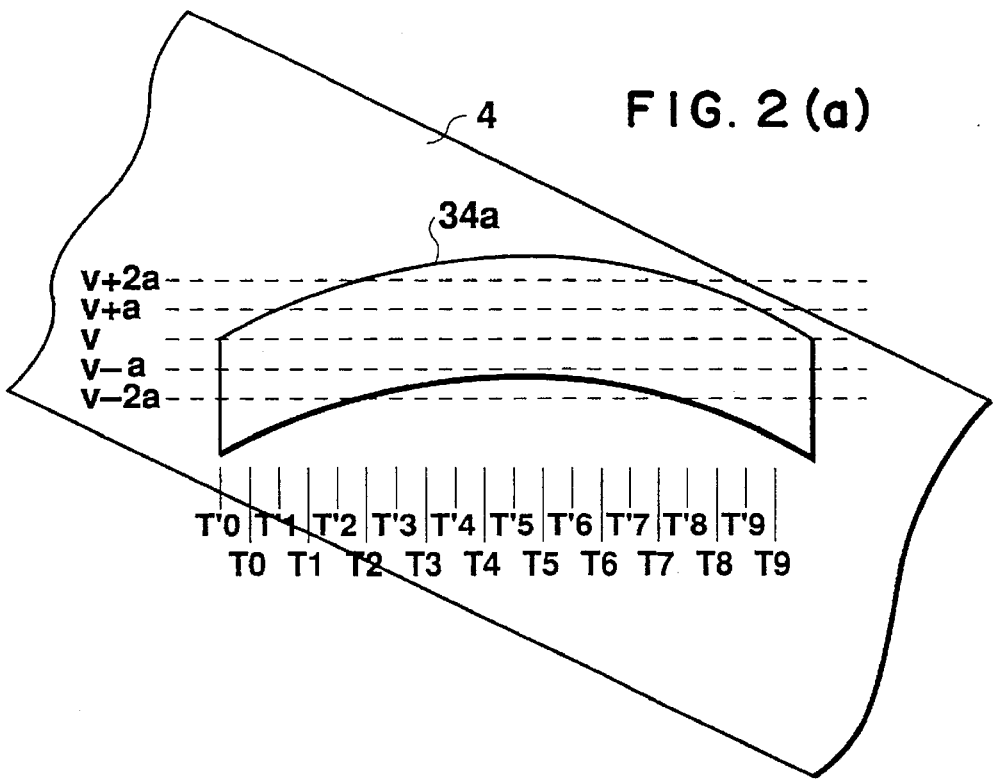
FIG. 2 (a)
FIG. 2 (b) — v+2a
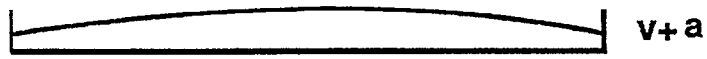
FIG. 2 (c) — v+a
FIG. 2 (d) — v
FIG. 2 (e) — v−a
FIG. 2 (f) — v−2a
PERIOD IN WHICH HEAD REPRODUCES TRACK

| $1_{00}$ | $1_{01}$ | $1_{02}$ | $1_{03}$ | $1_{04}$ | $1_{05}$ | $1_{06}$ | $1_{07}$ | $1_{08}$ | $1_{09}$ |
|---|---|---|---|---|---|---|---|---|---|
| $1_{10}$ | $1_{11}$ | $1_{12}$ | $1_{13}$ | $1_{14}$ | $1_{15}$ | $1_{16}$ | $1_{17}$ | $1_{18}$ | $1_{19}$ |
| $1_{20}$ | $1_{21}$ | $1_{22}$ | $1_{23}$ | $1_{24}$ | $1_{25}$ | $1_{26}$ | $1_{27}$ | $1_{28}$ | $1_{29}$ |
| $0_{00}$ | $0_{01}$ | $0_{02}$ | $0_{03}$ | $0_{04}$ | $0_{05}$ | $0_{06}$ | $0_{07}$ | $0_{08}$ | $0_{09}$ |
| $0_{10}$ | $0_{11}$ | $0_{12}$ | $0_{13}$ | $0_{14}$ | $0_{15}$ | $0_{16}$ | $0_{17}$ | $0_{18}$ | $0_{19}$ |
| $0_{20}$ | $0_{21}$ | $0_{22}$ | $0_{23}$ | $0_{24}$ | $0_{25}$ | $0_{26}$ | $0_{27}$ | $0_{28}$ | $0_{29}$ |
| X | Y | | | | | | | | |

FIG. 3

PERIOD IN WHICH HEAD REPRODUCES TRACK

PERIOD IN WHICH HEAD
REPRODUCES TRACK

METHOD AND APPARATUS FOR FOLLOWING CURVED TRACKS ON A TAPE

This application is a continuation of application Ser. No. 08/158,378 filed on Nov. 29, 1993, now abandoned; which was a continuation application of application Ser. No. 07/676,305, filed on Mar. 28, 1991, now abandoned.

BACKGROUND OF THE INVENTION

1. Field of the Invention

This invention relates to a reproducing method of a high-density magnetic recording and reproducing apparatus.

2. Description of the Related Art

A typical magnetic recording and reproducing method is exemplified by Japanese Patent Publication No. 50967/1989 as re-illustrated in FIGS. 9 and 10 of the accompanying drawings.

FIG. 9 shows the manner of attachment of a magnetic head of the known magnetic recording and reproducing apparatus, and FIG. 10 is a block diagram of the known apparatus. In the known apparatus, as shown in FIG. 9, a magnetic head 1 is attached to a rotary drum 3 by a movable element 2 such as a piezo-electric element, and the magnetic head 1 is movable in the directions of arrows by inputting a signal, such as an electrical signal, to the movable element 2. As shown in FIG. 10, the known apparatus includes a detector 8 for detecting the output of the magnetic head 1, a stepped signal generator 12 for generating a stepped signal, an analog/digital converter 18 for converting the output signals from the detector 8 and the signal generator 12 into digital signals, a memory 9 for storing the output of the analog/digital converter 18, an arithmetic operating unit 10 for performing a predetermined arithmetic operation on the content of the memory 9, and a digital/analog converter 11 for converting the result of the predetermined arithmetic operation into analog signals. The known apparatus also includes a sampling signal generator 15, amplifiers 14 and a reproducing mode changeover generator 13 for operating switches SW1, SW2.

To start reproducing, the reproducing mode changeover generator 13 is first operated to activate the switches SW1, SW2 as indicated by the dotted lines. A several-step signal (three-step signal in this example) generated from the stepped signal generator 12 in terms of fields as shown in FIG. 11 is applied to the movable element 2. Since the movable element 2 moves the magnetic head 1 transversely to the track 5 according to an applied voltage, the magnetic head 1 scans the positions a, b, c of FIG. 12 relative to the track 5. When making one scanning of the track 5 (about 17 ms), the magnetic head 1 does not change the applied voltage. At that time the reproduction output from the magnetic head 1 shows characteristic waveforms 16, 17, 19, depending on the position of the magnetic head 1. Also, at that time, the stepped signal voltages and the output waveforms 16, 17, 19 are stored in the memory 9 in a predetermined sampling period, and the switches SW1, SW2 are turned off. (See the position b of FIG. 11).

Given that the output waveforms 16, 17, 19 correspond to the applied voltage from the stepped signal generator 12, it is possible to obtain an amount of curvature of the track 5, for example, as shown in FIG. 14. In FIG. 14, with the optimum track position such that the reproduction output waveforms 16, 17, 19 from the magnetic head 1 are maximized, the waveform 20 connecting the successive points smoothly is produced by the arithmetic operating unit 10, and then the curvature of the track 5 is calculated. For increasing the degree of precision of tracing the track 5 by the magnetic head 1, if it is understood how high the reproduction voltage Vd at a maximum is outputted by the magnetic head 1, an amount of displacement of the track 5 is calculated from the difference between its voltage value (design voltage value) Vd and the maximum value when reproducing, and this difference must be canceled. Now assume that a maximum value is $V_{max}$; if it satisfies the following equation:

$$|V_d - V_{max}| \leq \epsilon$$

where $\epsilon$ is a very small value, and the magnetic head 1 can be regarded as substantially tracing the tracks exactly.

The obtained amount of curvature of the tracks is stored again in the memory 9. With the switches SW1, SW2 being turned off, a voltage for compensating the amount of curvature of the track 5 is applied from the point b of FIG. 11 to the movable element 2 via the digital/analog converter 11 at each scanning by the magnetic head 1 so that the best tracking can be performed without normally vibrating the magnetic head 1.

Only at an instantaneous time (the distance between the points c and d in FIG. 11) when the tape running mode is changed, is a stepped signal generated whereupon a new compensating signal is created in the previously described procedure.

In the case of a VTR, since the time needed for each scanning of the magnetic head 1 is about 17 ms, the period to generate stepped signals for ten scanning is about 170 ms, which has no adverse effect on the quality of picture.

In the foregoing example, the amount of curvature of the track 5 is obtained only while stepped signals are generated. Alternatively, in the beginning period of the duration between the points b and c in the application of the memory voltage of FIG. 11, the output voltage of the magnetic head 1, which is obtained by compensating the curvature of the track 5, may be compared with the design voltage value Vd, and checking may be made on whether the voltage for compensating the curvature of the track 5 is adequately high. If the voltage is inadequately high, the stepped voltage may be superposed with the track curvature compensating voltage to calculate the amount of track curvature again in an effort to improve the degree of compensating precision.

According to this known method, regarding even a magnetic tape on which information is recorded by the same magnetic recording apparatus, the curvature of the track 5 is subjected to changing with time such as due to the extending and shrinking of the magnetic tape as well as the changing of tension of a reproducing apparatus. Consequently, some measures are needed to meet with this changing with time.

In the known method, as described also in Japanese Patent Publication No. 50967/1989, the quality of the picture is deteriorated during the period immediately after reading of signals is started, namely, while stepped signals are generated. To follow the track curvature change with time, it is necessary to provide a period where stepped signals are generated during reproducing, which deteriorates the quality of the picture at the generation of each stepped signal. Further, for example, in the case of an ordinary home magnetic recording and reproducing apparatus, a magnetic tape to be reproduced can be recorded by a variety of magnetic recording apparatuses. Since there are individual differences in record levels between these various apparatuses, it is impossible to define the design voltage value uniquely so that the degree of precision of compensating the track curvature cannot be improved by a comparison with a constant value Vd.

SUMMARY OF THE INVENTION

It is therefore an object of this invention to provide a magnetic recording and reproducing apparatus in which a good reproduction image can be obtained even from a magnetic tape being locally different in record levels by following any track curvature change with time, without deteriorating the quality of the image during reproducing.

According to a first embodiment of the invention, there is provided a method for performing magnetic recording and reproducing by using a magnetic recording and reproducing apparatus which includes a movable element and a magnetic head carried by the movable element where the magnetic head is moved to trace a track written on a magnetic tape by applying an input signal to the movable element from an external device. The method comprises the steps of: (a) inputting a first predetermined pattern signal to the movable element in such a manner that a course of movement of the magnetic head is made based on a first pattern signal: (b) inputting a second predetermined pattern signal which is required for moving the magnetic head transversely to the track within a predetermined range of a track width to produce a first reproduction signal after applying said first predetermined pattern signal, for reading the first reproduction signal, for detecting such a position of the magnetic head that the first reproduction signal is maximized within a range of movement of the magnetic head and for moving the magnetic head to the first position detected, wherein said step (b) is repeated by using the pattern signal produced therein to produce a new pattern signal.

According to a second embodiment of the invention, there is provided a method for performing magnetic recording and reproducing by using a magnetic recording and reproducing apparatus which includes a movable element, and a magnetic head carried by the movable element where the magnetic head is moved to trace a track written on a magnetic tape by applying an input signal to the movable element from an external device. The method further comprises the steps of: (c) changing the position of the magnetic head transversely to the track by the movable element once during one or more periods in which the magnetic head fails to perform a reproduction of the track; (d) reproducing the track to produce a reproduction signal; and (e) moving the magnetic head, during the period in which the magnetic head fails to perform a reproduction of the track; in which the following steps are performed with the moved position regarded as an initial offset; (f) inputting a first predetermined signal to the movable element in such a manner that a course of movement of the magnetic head is made based on a first pattern signal; (g) inputting said second predetermined pattern signal which is required for moving the magnetic head transversely to the track within a predetermined range of a track width to produce said first reproduction signal after applying the first predetermined pattern to the movable pattern, for reading the first reproduction signal, for detecting such a position of the magnetic head that the first reproduction signal is maximized within a range of movement of the magnetic head and for moving the magnetic head to the first position detected, wherein said step (b) is repeated by using the pattern signal therein to produce a new pattern signal.

In the method of the invention, partly since the position of the magnetic head in the step of detecting such that reproduction signals are maximal within the range of the transverse movement of the magnetic head, i.e., the range of less than ⅓ of the track width is detected, and partly since their corresponding pattern signals are inputted as renewed successively, a good reproduction image can be obtained even from a magnetic tape being locally different in record levels, following any track curvature change with time, without deteriorating the quality of the image during reproduction.

The above and other advantages, features and additional objects of this invention will be manifest to those versed in the art upon making reference to the following detailed description and the accompanying drawings in which two preferred embodiments incorporating the principles of this invention are shown by way of illustrative examples.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2(a) through 2(f) are diagrams showing a recorded track and various envelope detected signals;

FIG. 3 is a table of addresses in a data memory for the apparatus in an embodiment of the present invention;

DETAILED DESCRIPTION FOR THE PREFERRED EMBODIMENTS OF THE PRESENT INVENTION

Embodiment 1

A first embodiment of this invention will now be described in connection with the accompanying drawings.

Figure 1:
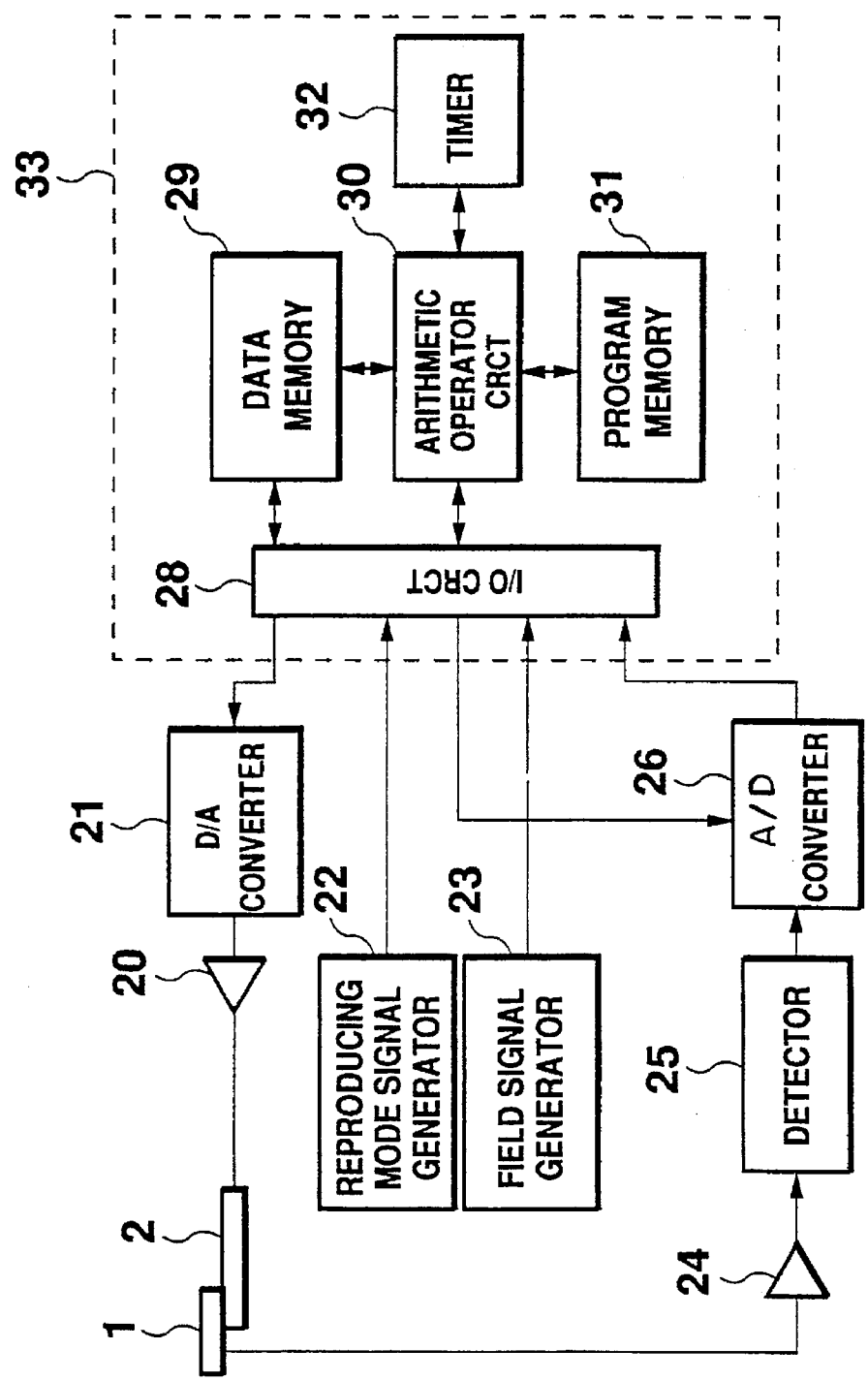
FIG. 1 is a block diagram showing a magnetic recording and apparatus for an embodiment of the present invention.

In FIG. 1, the reproduction output of a magnetic head 1 is amplified by an amplifier 24 and then inputted to a detector 25 where the amplified output signal is envelope-detected. The detected output signal is inputted to an analog/digital converter 26 where the detected output signal is converted into a digital signal. Then the output of the analog/digital converter 26 is inputted to an input/output circuit 28 of a microcomputer 33. A timing signal sampled by the analog/digital converter 26 is outputted from the input/output circuit 28. The output of a reproducing mode signal generator 22 for outputting a signal (hereinafter called "PB") indicating whether it is the reproducing mode or not is also inputted to the input/output circuit 28. When the outputted signal is at a high level (hereinafter called "H"), it is the reproducing mode. Otherwise, a low level (hereinafter called "L") is outputted from the reproducing-mode signal generator 22. The output of a field signal generator 23 for outputting a signal (hereinafter called "FD") switchable in terms of fields is also inputted to the input/output circuit 28 of the microcomputer 33. When the magnetic head 1 is in a field to be reproduced, H is outputted from the field signal generator 23. Otherwise, L is outputted from the field signal generator 23. After being converted by a digital/analog converter 21, the signal outputted from the input/output circuit 28 is amplified by an amplifier 20 and is then applied to a movable element 2. The microcomputer 33 includes the input/output circuit 28 for inputting signals from the reproducing mode signal generator 22, the field signal generator 23 and the analog/digital converter 26 and for outputting signals to the digital/analog converter 21 and the analog/digital converter 26, an arithmetic operator circuit 30 for performing an arithmetic operation, a program memory 31 for dealing with instructions for actions, and a timer 32 for measuring time.

The apparatus of FIG. 1 operates as follows.

Figure 8:
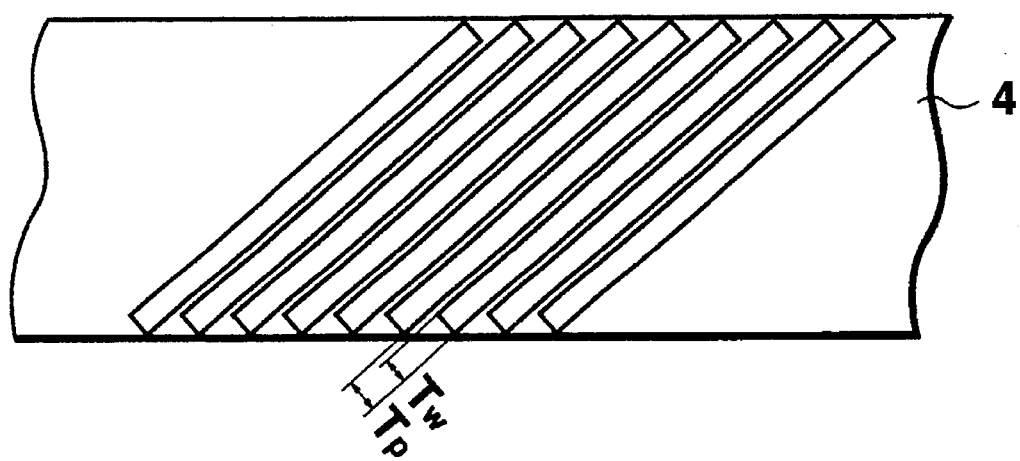
FIG. 8 is a diagram showing the track pitch.
Figure 9:
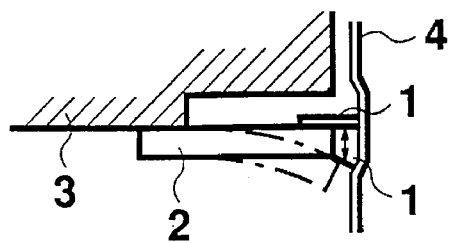
FIG. 9 is a cross-sectional view showing the manner in which a magnetic head is attached.
Figure 10:
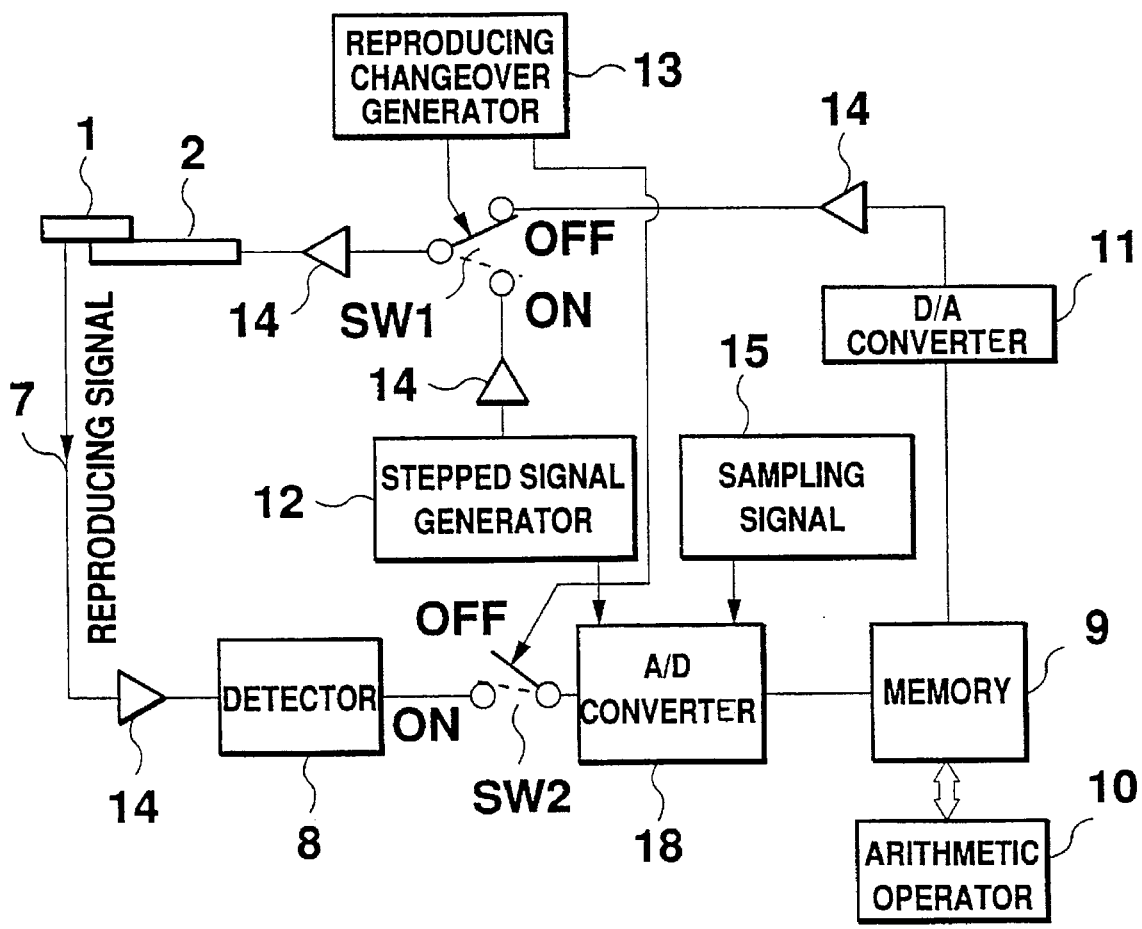
FIG. 10 is a block diagram showing a known magnetic recording and reproducing apparatus.
Figure 11:
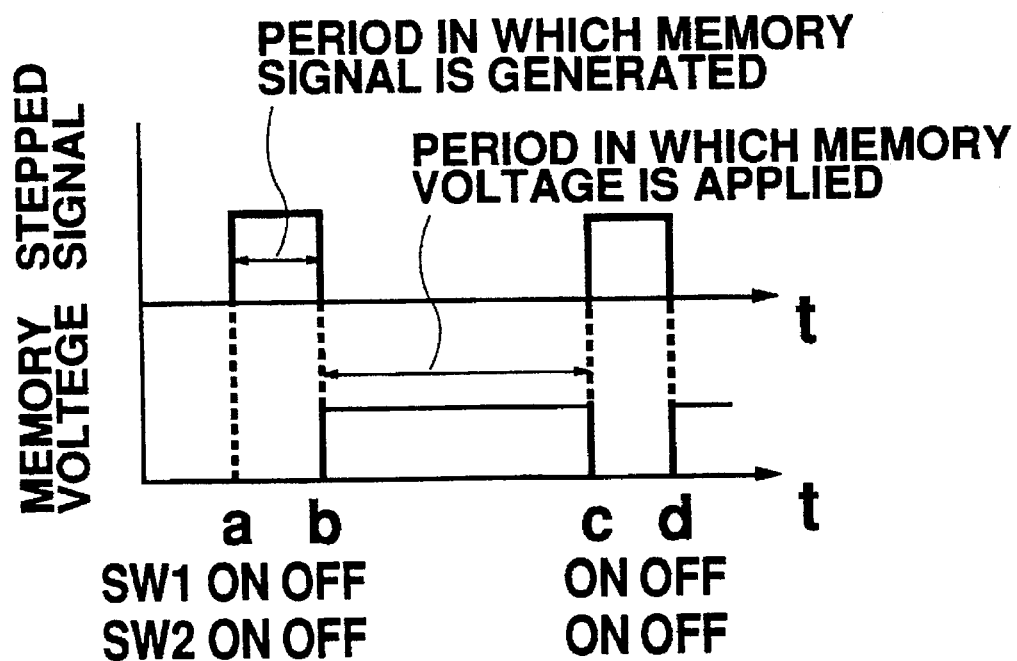
FIG. 11 is an operational waveform of the known apparatus.
Figure 12:
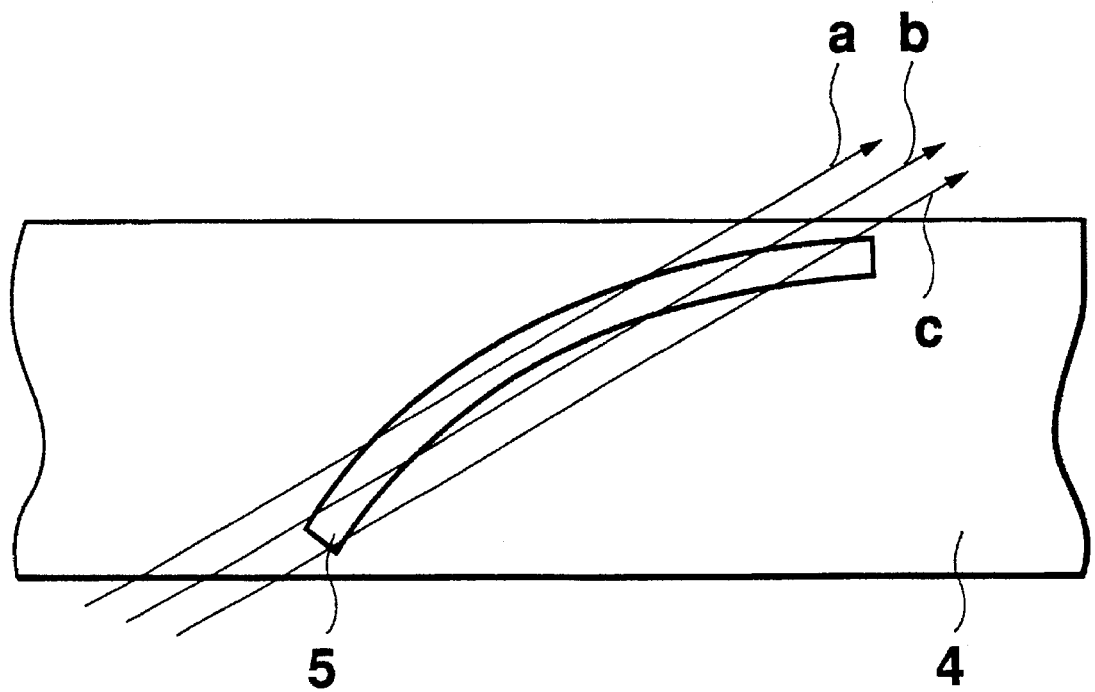
FIG. 12 is a diagram showing a magnetic head scanning method in the known apparatus.
Figure 13:
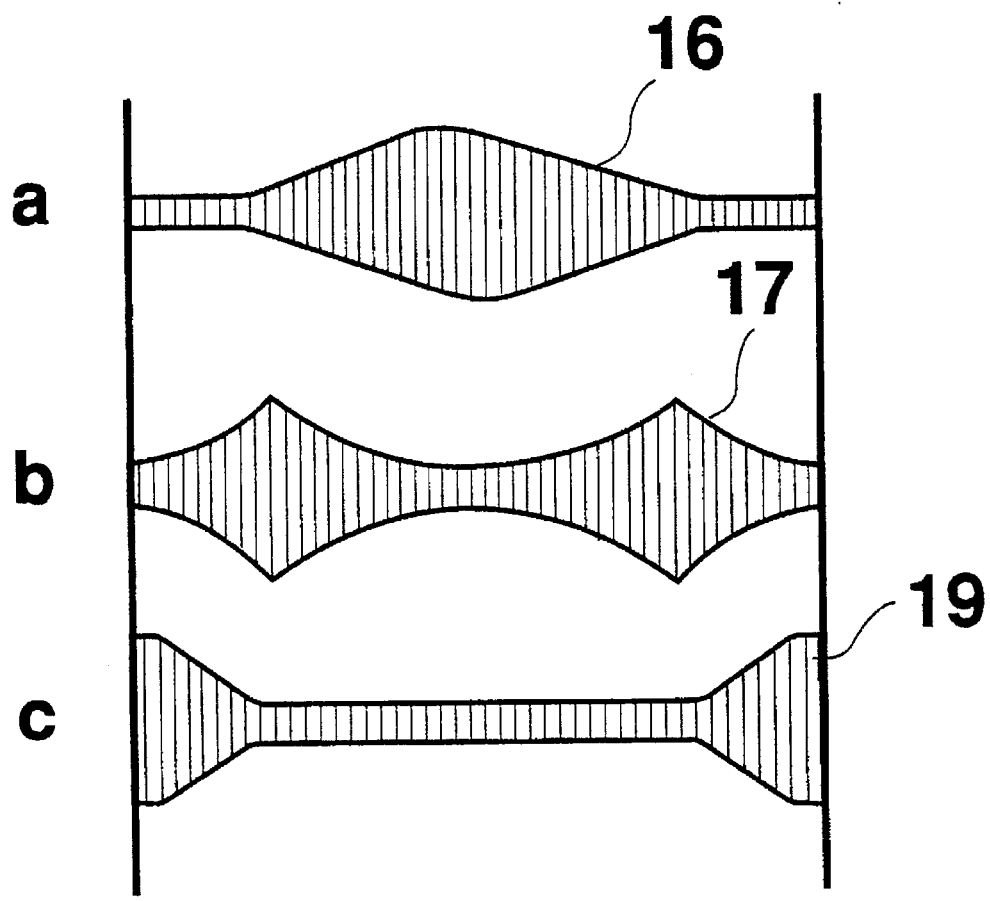
FIG. 13(a) through 13(c) are diagrams showing output waveforms of a magnetic head in the known apparatus.
Figure 14:
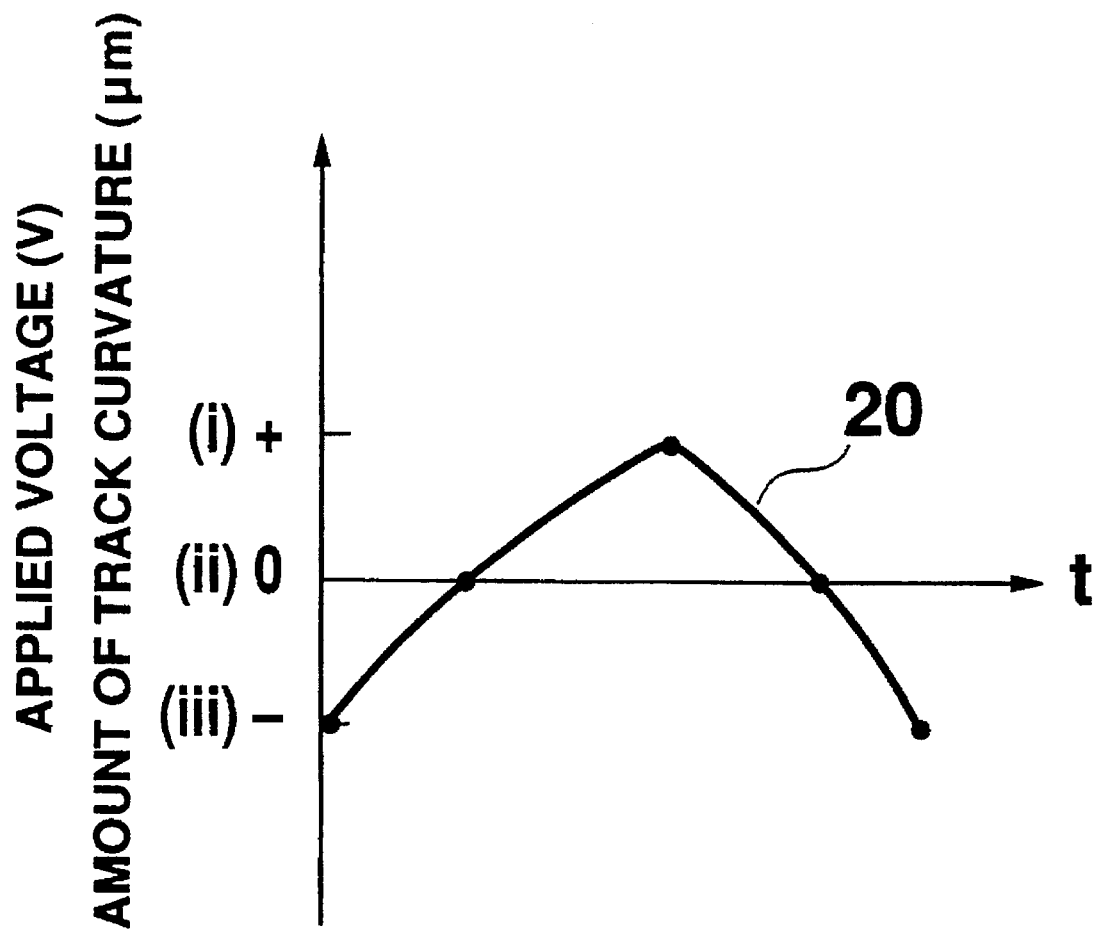
FIG. 14 is a graph showing a track curvature stored in a memory in the known apparatus.

In FIG. 2(a), reference numeral 34a designates a track recorded on a magnetic tape 4. A signal V, such that the position of the magnetic head 1 is v, is first outputted from the input/output circuit 28 and is converted into an analog signal by the digital/analog converter 21 whereupon the resulting signal is amplified by the amplifier 20 and is then applied to the movable element 2. The output of the detector 25 at that time is shown in FIG. 2(d). Experiments indicate that when the magnetic head 1 was moved transversely to the track within the range of less than ⅓ of the track width, an image being markably deteriorated was not recognized. In FIG. 8, in which the track is recorded on the magnetic tape 4, $T_p$ stands for the track pitch, and $T_w$ stands for the track width. If there is no guard band, $T_w$ coincides with $T_p$.

In this embodiment, the amount of movement of the magnetic head 1 is set within the range of +/− a (the output signal outputted from the input/output circuit 28 to the digital/analog converter 21 and corresponding to the range of +/− a is set within the range of +/−A). Then signals V+A and V−A such that the magnetic head 1 is located at v+a and v−a, respectively, are likewise outputted from the input/output circuit 28 to the digital/analog converter 21. At that time the outputs of the detector 25 are as shown in FIGS. 2(c) and 2(e), and these signals shown in FIGS. 2(c), 2(d) and 2(e) are measured by the timer 32, are converted into digital signals by the analog/digital converter 26 at the timing of T0–T9 by the sampling signals inputted to the analog/digital converter 26 via the input/output circuit 28, and are stored in the data memory 29 via the input/output circuit 28.

Figure 4:
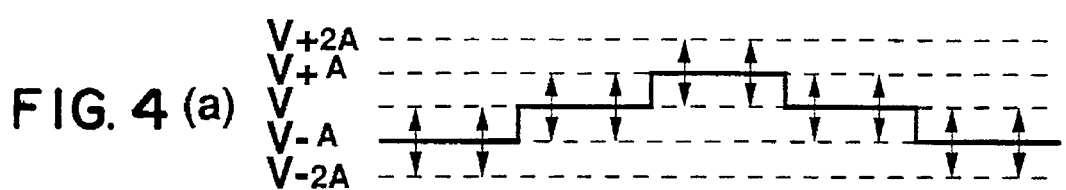
FIGS. 4(a) through 4(d) are diagrams showing output signal patterns and envelope detected signals from a microcomputer for the apparatus in an embodiment of the present invention.
Figure 4:
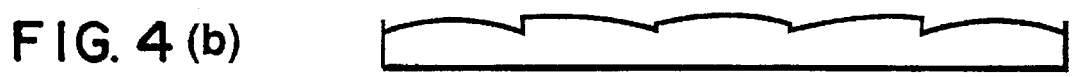
Figure 4:
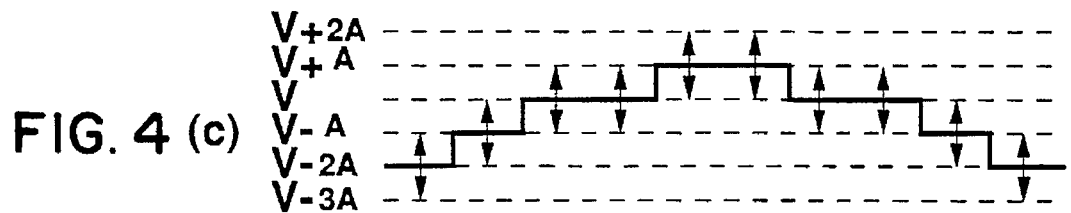
Figure 4:

Subsequently, the envelope detected signal is maximized, by which the position of v+a, v and v−a for the magnetic head 1 is determined for each of the respective times of T0–T9, as calculated by the arithmetic operator circuit 30, and detected from the data of the data memory 29. Further, the signal (V+A when v+a; V when v; and V−A when v−a) needed for the output of the detector 25 to be maximized at the time of Tk (k=0 to 9) is outputted from the input/output circuit 28 to the digital/analog converter 21 at the timing of T'k (k=0 to 9) measured by the timer 32. The signal pattern to be outputted from the input/output circuit 28 at that time is indicated by a solid line in FIG. 4(a). In view of the sampling hold in the analog/digital converter 26 and the delay in the other circuits as well as the response time of the movable element 2, Tk≧T'k. The detected signal to be outputted from the detector 25 at this time is shown in FIG. 4(b). The detected signal of FIG. 4(b) is sampled again by the analog/digital converter 26 at the timing of T0 to T9 and is then stored in the data memory 29 via the input/output circuit 28.

The signal pattern of FIG. 4(a) is changed by an offset level upwardly by +A as indicated by the upward arrow. As a result, V−A is changed to V; V is changed to V+A; and V+A is changed to V+2A. The current output of the detector 25 is sampled by the analog/digital converter 26 at the timing of T0 to T9 and is stored in the data memory 29 via the input/output circuit 28. Likewise the output of the detector 25 when the signal pattern of FIG. 4(a) is changed by an offset level downwardly by −A as indicated by the downward arrow, is also stored in the data memory 29. Detection is made, from the data of the data memory 29 by the arithmetic operator circuit 30, as to which one of the three cases (1. the pattern of FIG. 4(a), 2. changed by +A, and 3. changed by −A). The detected signal is maximized at the time of T0 to T9, and the current output signal is outputted to the digital/analog converter 21 from the input/output circuit 28 at the timing of T'0 to T'9. The output signal pattern is shown in FIG. 4(c). The current detected signal from the detector 25 is shown in FIG. 4(d), from which it is noted that a good reproducing signal from the curved track is provided like the track 34a of FIG. 2(a).

Figure 5A:
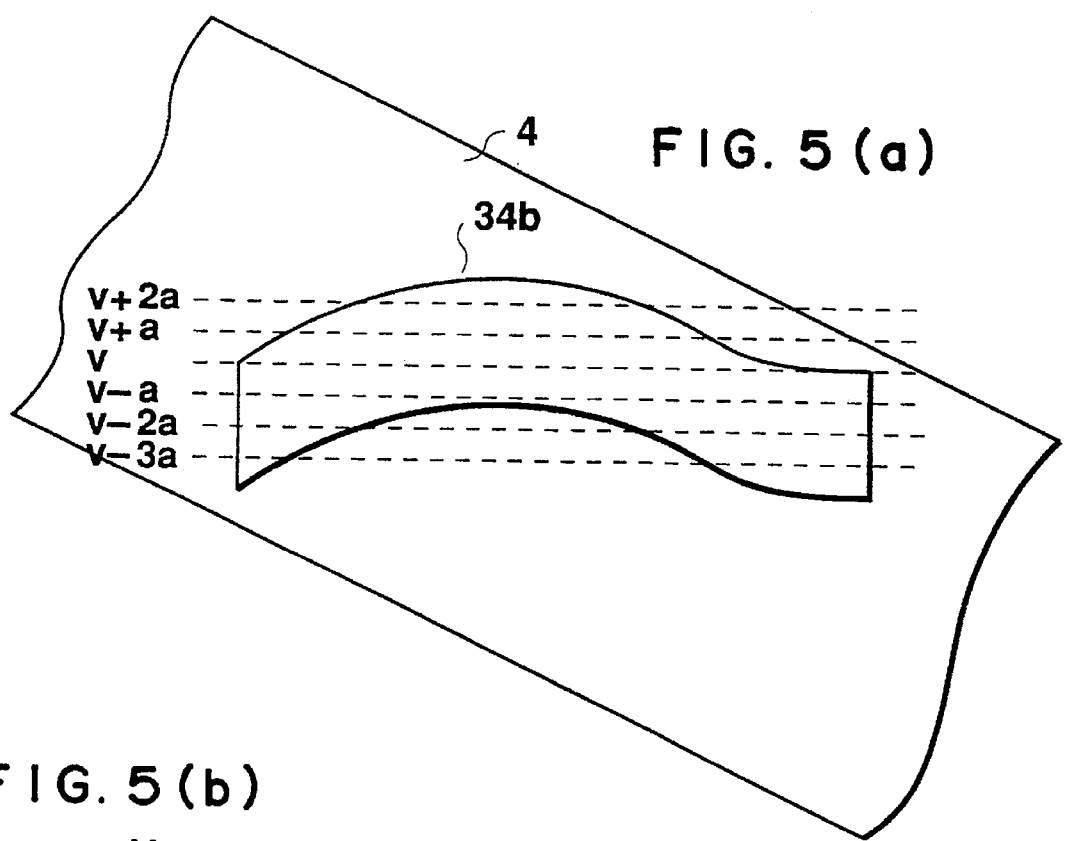
FIGS. 5(a) through 5(c) are diagrams showing a track, when its curvature is changed with time, as well as an output pattern and an envelope detected signal from the microcomputer at that time.

If the foregoing procedures are repeated thereafter, the signal outputted from the input/output circuit 28 to the digital/analog converter 21 will not be changed from the signal pattern of FIG. 4(c) as long as the curvature of the track retains the posture of the curved track 34a. As a result, the output of the detector 25 is also kept as shown in FIG. 4(d) so that a good reproducing signal is retained. Although a magnetic tape 4 is recorded by the same magnetic recording apparatus, the track curvature is subjected to changing with time, for example, changes due to extending and shrinking of the magnetic tape 4 as well as the tension of the reproducing apparatus. Even in that case, by repeating the foregoing procedures, it is possible to retain a good reproduction output. For example, when the track curvature is changed from the track curvature 34a of FIG. 2(a) to the track curvature 34b of FIG. 5(a) as time passes, the signal pattern shown by the solid line of FIG. 4(c) is changed in offset level by+/−A upwardly and downwardly of the track as indicated by the arrows. Detection is made as to which case the reproduction output is maximized at each time of T0 to T9, and the current output signal is outputted from the input/output circuit 28 to the digital/analog converter 21 at the timing of T'0 to T'9. The output signal pattern at that time is shown by the solid line of FIG. 5(a), while the detected signal from the detector 25 is shown in FIG. 5(d). It is accordingly apparent that the magnetic head 1 follows the change of the track curvature with time, for thus retaining a good reproducing signal.

Figure 6A:
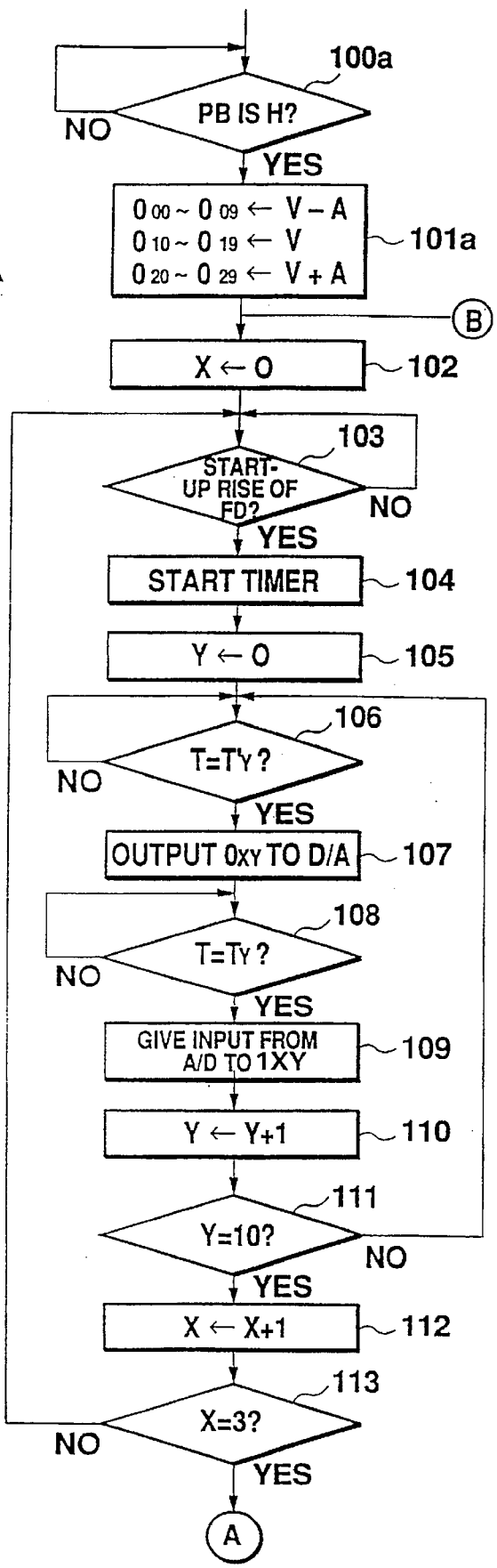
FIGS. 6A and 6B are a combined flowchart showing the procedures of operation according to one embodiment of the invention.
Figure 6B:
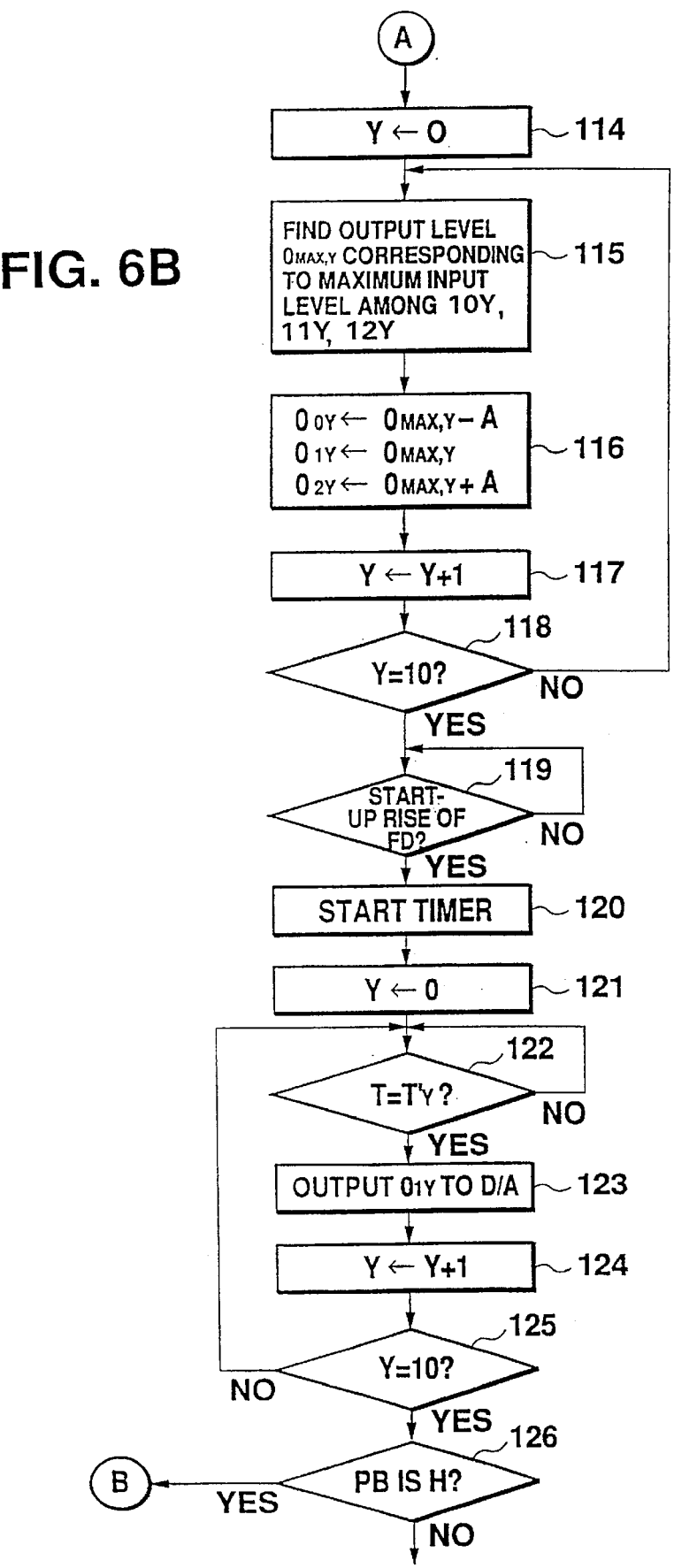

The operation will now be described in connection with the combined flowchart of FIGS. 6A and 6B.

A detection is first made on whether the routine is in the reproducing mode or not at STEP 100a; if the reproducing mode is detected, the routine goes to STEP 101a. If the reproducing mode is not detected, the routine waits until the reproducing mode is initiated. At STEP 101a, in the data memory 29 addressed as shown in FIG. 3, the data V–A is previously inputted to addresses 000 to 009; the data V is previously inputted to addresses 010 to 019; and the data V+A is previously inputted to addresses 020 to 029. Then at STEP 102, 0 is previously stored in an X address of the data memory 29. At STEP 103, the start-up rise of FD is previously detected, namely, the magnetic head 1 previously detects whether the track to be reproduced has come or not. If the start-up rise is detected, the routine goes to STEP 104; otherwise, the routine waits until the start-up rise begins.

Subsequently at STEP 104, after the timer 32 is reset, the time is started to be measured. At STEP 105, 0 is previously stored in an Y address of the data memory 29. Then at STEP 106, the routine waits until T'0 is detected. If T'0 is detected, the value V–A previously stored in the address 000 is outputted from the data memory 29 to the digital/analog converter 21 via the input/output circuit 28. At STEP 108, the routine waits until T0 is detected; if T0 is detected, the sampling signal is outputted to the analog/digital converter 26, and the sampled data is stored in the address 100 of the data memory 29 via the input/output circuit 28. Then at STEP 110, 1 is added to the content of the Y address, and since the content of the Y address is not 10 at STEP 111, the routine returns to STEP 106.

Likewise, the procedures from STEP 106 to STEP 111 are repeated until the content of the Y address will be 10. As a result, the data sampled at the timing of T1 to T9 by outputting the content V–A of addresses 001 to 009 is stored in addresses 110 to 119.

Then at STEP 113, 1 is added to the content of the X address. Since the content of the X address is not 3 at STEP 113, the routine returns to STEP 102, and the procedures from STEP 103 to STEP 113 are repeated until the content of the X address is 3. Thus the content V of addresses 010 to 019 is outputted, and the data sampled at the timing of T1 to T9 is stored in addresses 110 to 119. Further, the content V+A of addresses 020 to 029 is outputted, and the data sampled at the timing of T1 to T9 is stored in addresses 120 to 129. Namely, the signals of FIGS. 2(c), 2(d) and 2(e) are sampled, and these sampled signals are stored in the data memory 29.

At STEP 114, 0 is stored in the Y address. Then at STEP 115, 0 MAX, Y corresponds to the time when the content of the address among 100, 110, 120 is maximized. In other words, if address 100 is maximized, 000 is 0 MAX, Y; if 110 is maximized, 010 is 0 MAX, Y; and if 120 is maximized, 020 is 0 MAX, Y. At STEP 116, the data (0 MAX, Y–A) is stored in address 000, and the data 0 MAX, Y is stored in address 010, and the data (0 MAX, Y+A) is stored in address 020. Then at STEP 117, 1 is added to the content of the Y address. Since the content of the Y address is not 10, the routine returns to STEP 115.

Likewise, the procedures from STEP 115 and STEP 118 are repeated until the content of the Y address is 10. As a result, the output level to the digital/analog converter 21 corresponding to the maximized input signal from the analog/digital converter 26 at the respective time of T0 to T9 is stored in 010 to 019, and the signals imparted to the foregoing level offsets –A and +A are stored in addresses 000 to 009 and addresses 020 to 029. In other words, the signal pattern data indicated by a solid line in FIG. 4(a) is stored in addresses 010 to 019.

Then the routine waits until the start-up rise of FD at STEP 119, namely, until the track to be reproduced arrives. Upon detection of the start-up rise of FD, the timer 32 is reset and then the time at STEP 120 is started to be measured. At STEP 121, 0 is stored in the Y address. At STEP 122, the routine waits until the time of T'0 is detected. If the time of T'0 is detected, the content of address 010 is outputted from the input/output circuit 28 to the digital/analog converter 21 at STEP 123. At STEP 124, 1 is added to the content of the Y address. Then at STEP 125, since the content of the Y address is not 10, the routine returns to STEP 122, and the procedures from STEP 122 to STEP 125 are repeated until the content of the Y address is 10. As a result, the signal pattern of FIG. 4(a) is outputted from the input/output circuit 28 to the digital/analog converter 21. Then at STEP 126, if PB is H, the routine returns to STEP 102. If PB is L, a mode other than the reproducing mode is performed so that the routine moves to a subsequent process. When PB is H and the routine returns to STEP 102 the procedures from STEP 102 to STEP 113 are repeated until the content of the X address is 3.

By repeating the procedures from STEP 114 to STEP 118, the output signal pattern data is stored in addresses 010 to 019. By imparting the output signal pattern data offset by –A and +A, the input signal data is stored in addresses 000 to 009 and addresses 020 to 029. When three signal pattern data are stored in addresses 000 to 009 and addresses 020 to 029 is imparted, the input signal data is obtained from the analog/digital converter 26. The output signal pattern data and the input signal pattern data are stored in addresses 110 to 119, addresses 100 to 109 and addresses 120 to 129. Then a new signal pattern is developed by the procedures from STEP 114 to STEP 118 and is stored in addresses 010 to 019. By repeating the procedures from STEP 119 to STEP 125, the new signal pattern is outputted from the input/output circuit 28 to the digital/analog converter 21. This output pattern is indicated by a solid in FIG. 4(c).

The foregoing procedures for the reproducing mode are repeated until PB is L at STEP 126. In short, by repeating the procedures from STEP 102 to STEP 113, three signal patterns, i.e., a first signal pattern, a second signal pattern imparted with an offset of –A, and a third signal pattern imparted with an offset of +A are outputted. The input data from the analog/digital converter 26 in the individual case is stored in the data memory 29. From this input data, a best new pattern is previously determined by repeating the procedures from STEP 114 to STEP 118. By repeating the procedures from STEP 119 to STEP 125, this new pattern is outputted from the input/output circuit 28 to the digital/analog converter 21. If PB is H, the routine returns to STEP 102 to repeat again a succession of procedures.

Embodiment 2

The construction of this embodiment is identical with that of Embodiment 1 (FIG. 1) and is therefore omitted here for clarity.

In FIG. 2(a), if the track recorded on the magnetic tape 4 is a track 34a, the signal V, such that the position of the magnetic head 1 is v, is outputted from the input/output circuit 28 and is converted into an analog signal by the digital/analog converter 21, whereupon the analog signal is amplified by the amplifier 20 and is then applied to the movable element 2. The output of the detector 25 at that time is shown in FIG. 2(d).

The position v of the magnetic head 1 is first moved by +/– 2a. Then signals V+2A, V+A, V–A and V–2A are produced such that the magnetic head 1 is located at the position v+2a, v+a, v–a and v–2a. At that time the outputs of the detector 25 are as shown in FIGS. 2(b) through 2(f). Among the signals of FIGS. 2(b) through 2(f), the signal of FIG. 2(b) through 2(f), the signal of FIG. 2(b) is measured by the timer 32 and is then converted into a digital signal by the analog/digital converter 26 at the timing of T0 to T9 by the sampling signal inputted to the analog/digital converter 26 via the input/output circuit 28. 10 data are summed, and the resulting data are then divided by 10 to obtain an average value. This value is stored in the data memory 29 via the input/output circuit 28. Likewise in the case of each of FIGS. 2(c), 2(e) and 2(f), an average value is obtained and is then stored in the data memory 29. The output signal from the input/output circuit 28 to the digital/analog converter 21 corresponding to the maximum of these average values is determined. In the case of the signal of FIG. 2(a), the average value is maximized at the time of FIG. 2(d), and its corresponding output signal is V. The signal V obtained by the above-described procedures is outputted to the digital/analog converter 21. Thus the positional difference of the magnetic head 1 relative to the track has been compensated.

Then the magnetic head 1 is moved transversely to the track by +/− a about the position V. Similarly to the previous case, the outputs of the detector 25 at that time are as shown in FIG. 2(c), 2(d) and 2(e). The subsequent procedures of this embodiment are identical with those of Embodiment 1 and are therefore omitted here for clarity.

Figure 7A:
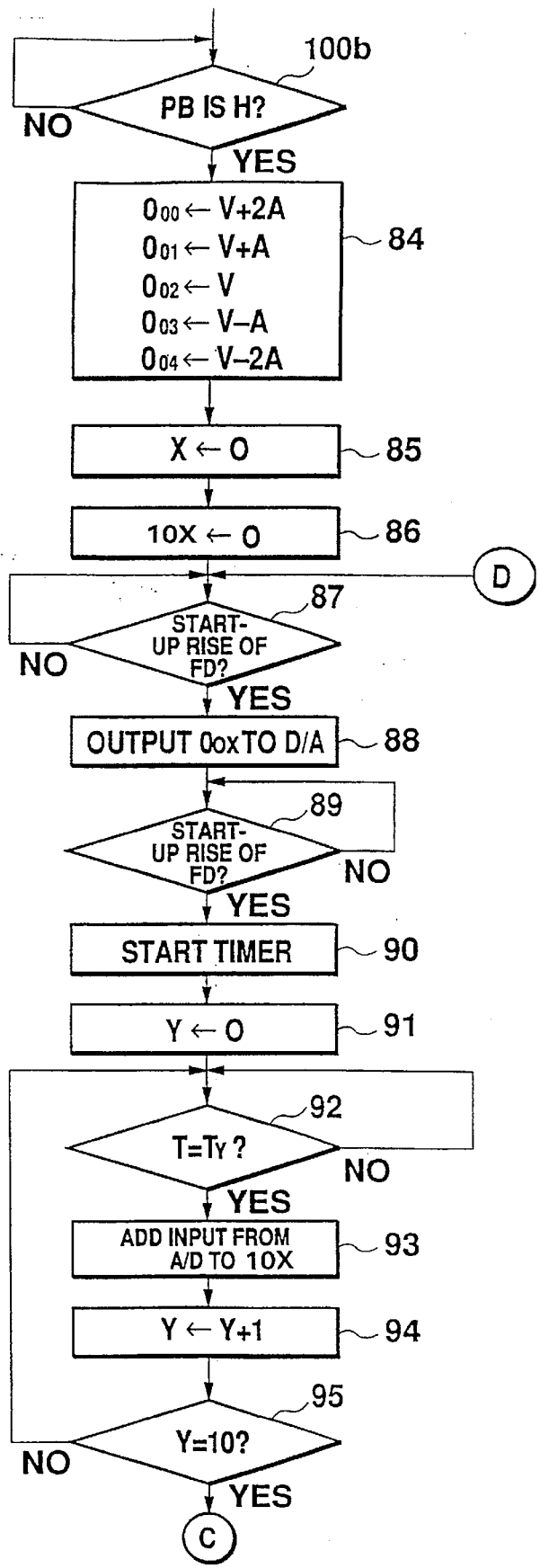
FIGS. 7A and 7B are a combined flowchart showing the procedures of operation according to another embodiment of the invention.
Figure 7B:
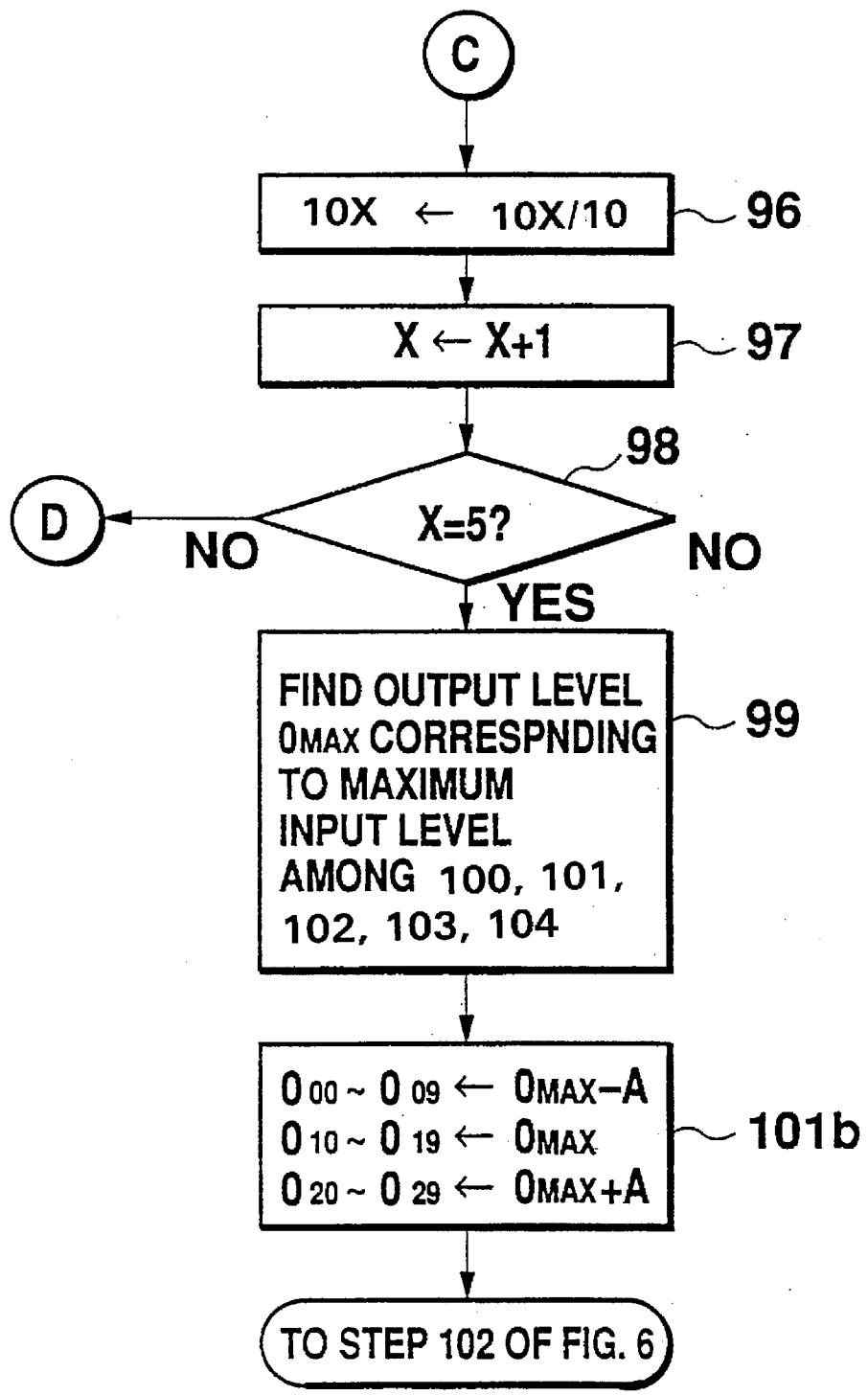

The operation of Embodiment 2 will now be described in connection with the flowchart of FIGS. 7A and 7B. At STEP 100b, a detection is first made on whether the operation is in the reproducing mode or not. If the operation is in the reproducing mode, the routine moves to STEP 84. Otherwise, the routine waits until the reproducing mode is initiated. At STEP 84, in the data memory 29 addressed as shown in FIG. 3, V+2A is stored in address 000; and V−2A is stored in address 004. Then at STEP 85, 0 is previously stored in the X address and at step 87, 0 is previously stored in address 10X. At STEP 87, the routine waits until the start-up rise of FD, and the magnetic head 1 detects the beginning of the period in which the track is not reproduced. Then at STEP 88, the content of address 000, i.e., V+2A is previously outputted to the digital/analog converter 21.

At STEP 89, the start-up rise of FD, i.e., the time for the magnetic head 1 to start reproducing the track, is detected, and at STEP 90, the timer 32 is reset and the time starts to be measured. At STEP 91, 0 is stored in the Y address. Then at STEP 92, the routine waits until time T0 is detected. If T0 is detected, the input data inputted from the analog/digital converter 26 via the input/output circuit 28 is added to the content of address 100 at STEP 93. At STEP 94, 1 is added to the content of the Y address; since the content of Y address is not 10 at STEP 95, the routine returns to STEP 92.

Likewise, the procedures from STEP 92 to STEP 95 are repeated until the content of the Y address is 10. In other words, all the data sampled at the timing of T0 to T9 when the content V+2A of address 000 is outputted to the digital/analog converter 21 have been summed and stored in address 100. Then at STEP 96, the content of address 100 is divided by 10, and the resulting divided data are stored again in address 100. Thus an average value of 10 data is sampled at the timing of T0 to T9 . At STEP 97, 1 is added to the content of the X address; since the content of the X address is not 5, the routine returns to STEP 87 where the procedures from STEP 87 to STEP 98 are repeated until the content of the X address is 5. Specifically, when V+A, V, V−A and V−2A stored in addresses 001, 002, 003 and 004, respectively, are outputted to the digital/analog converter 21, individual average values of 10 data sampled at the time of T0 to T9 are obtained and stored in addresses 101, 102, 103 and 104, respectively. Then at STEP 99, the address 0 MAX is determined (if the content of address 100 is maximized, the address 000 is 0 MAX; if the content of address 101 is maximized, the address 001 is 0 MAX; if the content of address 102 is maximized, the address 002 is 0 MAX; if the content of address 103 is maximized, the address 003 is 0 MAX; if the content of address 104 is maximized, the address 004 is 0 MAX) corresponding to the output signal to the digital/analog converter 21 which corresponds to the data maximized in the contents of addresses 100, 101, 102, 103 and 104. In the case of FIG. 2(a), since the detected signal of the output of the detector 25 of FIG. 2(d) is maximized, address 002 is 0 MAX so that the output of the detector 25 is maximized when the content V of address 002 is outputted. Thus the positional difference of the magnetic head 1 relative to the track has been compensated.

Then at STEP 101b, the value V−A (A is subtracted from the content of address 0 MAX) is previously stored in addresses 000 to 009, and likewise the data V and the data V+A are previously inputted in addresses 010 to 019, respectively.

Subsequently, the routine moves to STEP 102 of FIG. 6, and the same subsequent procedures as those of Embodiment 1 are performed.

Embodiment 3

Figure 5B:
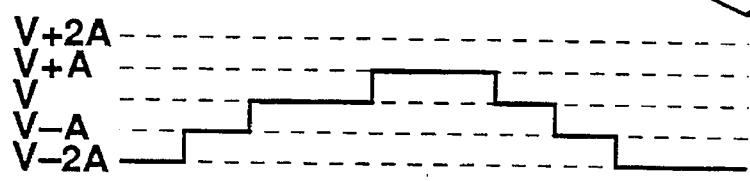
Figure 5C:

In Embodiments 1 and 2, the signal which is outputted from the input/output circuit 28, is converted into an analog signal by the digital/analog converter 21 and is applied to the movable element 2 via the amplifier 20 which is changed in a stepped form. Practically, when considering the response region of the movable element 2, the signal patterns of FIGS. 4(a) and 4(c) are joined with the signal pattern of FIG. 5(b) by a smooth curve to provide a smooth signal. Thus each of the detected signals of FIGS. 4(b) and 4(d) and FIG. 5(c) also assumes a smooth form rather than a sawtooth form. Further, in the foregoing embodiments, a microcomputer is used. Alternatively, hardware may be used instead of the microcomputer. If the detected signal is remarkably changed about the entrance of the track, the procedure to output the content of addresses OXO and 010 to the digital/analog converter 21 may take place immediately before STEPS 103 and 119.

If the track curvature is changed gently with time, the procedure to output new patterns from STEP 119 to STEP 125 may be repeated for a certain period to lengthen the interval for renewing the pattern. At STEP 101, constant signals are given to addresses 000 to 009, addresses 010 to 019 and addresses 020 to 029. Alternatively, non-constant signals may be applied so as to provide signal patterns suited for a magnetic recording and reproducing apparatus.

Embodiment 4

In Embodiment 2, for compensating the positional difference of the magnetic head 1 relative to the track, the range of movement of the magnetic head 1 is divided into five steps, from v+2a to v−2a. This invention should by no means be limited to this specific number of steps. If the number of steps is increased, it is possible to improve the degree of compensating precision. Also, an effective reproducing envelope detected signal can be obtained within the range from a first position where the lower end of the reproducing head is located at the upper end of the track to a second position where the upper end of the reproducing head is located at the lower end of the track. Consequently the range of movement of the reproducing head should not have been limited within the range from v+2a to v−2a.

Furthermore, the positional difference is detected simply by summing and averaging the data at each sampling point.

In an alternative way, overlapping of data takes place at every sampling point, and then an average is obtained to detect the positional difference.

As mentioned above, according to the method of the invention, partly since the position of the magnetic head is detected such that reproduction signals are maximized within the range of the transverse movement of the magnetic head, i.e., the range of less than ⅓ of the track width is detected, and partly since their corresponding pattern signals are inputted as renewed successively, a good reproduction image can be obtained even from a magnetic tape having locally different record levels, following any track curvature change with time, without deteriorating the quality of the image during reproduction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for performing magnetic recording and reproducing by using a magnetic recording and reproducing apparatus which includes a movable element and a magnetic head carried by the movable element where the magnetic head is moved to trace tracks written on a magnetic tape by applying an input signal to the movable element from an external device, said method comprising the steps of:

(a) inputting optimum control pattern data;

(b) applying said optimum control pattern data to the movable element to move the magnetic head along an entire longitudinal length of a first track;

(c) storing signals detected by said magnetic head, as a result of the step (b), in a memory as first detected data;

(d) obtaining added secondary control pattern data, having values differing from said optimum control pattern data by a positive constant, and applying said added secondary control pattern data to the movable element to move the magnetic head along the entire longitudinal length of a second track;

(e) obtaining subtracted secondary control pattern data, having values differing from said optimum control pattern data by a negative constant, and applying said subtracted secondary control pattern data to the movable element to move the magnetic head along the entire longitudinal length of a third track;

(f) storing signals detected by said magnetic head, as a result of the steps (d) and (e), in the memory as a second and a third detected data, respectively;

(g) comparing respective, discrete segments of said first detected data, said second detected data and said third detected data to identify the maximum segments thereof;

(h) replacing discrete segments of said optimum control pattern data only with discrete segments of said added and subtracted secondary control pattern data which correspond to said maximum segments to update said optimum control pattern data; and (i) repeating the steps (b)–(h) using the updated optimum control pattern data as the optimum control pattern data.

2. A method according to claim 1, wherein the movable element comprises a piezoelectric element.

3. A method according to claim 1, wherein the input signal applied to move the magnetic head to trace a track written on the magnetic tape comprises an electrical signal.

4. A magnetic recording and reproducing apparatus comprising:

a magnetic head carried by a movable element for moving said magnetic head over an advancing magnetic tape;

an external device for applying an input signal to said movable element and moving said magnetic head to trace tracks written on said magnetic tape;

a memory for storing a plurality of pattern signals including optimum control pattern data and secondary control pattern data, said secondary control pattern data including added secondary control pattern data that differs from said optimum control pattern data at each point by a positive constant and subtracted secondary control pattern data that differs from said optimum control pattern data at each point by a negative constant;

means for inputting said optimum control pattern data to said movable element for moving said magnetic head in a optimum control pattern along an entire longitudinal length of a first track;

means for storing signals output from said magnetic head in said memory, as first detected data when the magnetic head is moved according to the optimum control pattern data;

means for inputting said added and subtracted secondary control pattern data to said movable element for moving said magnetic head in secondary control patterns along an entire longitudinal length of a second and a third track, respectively;

means for storing signals output from said magnetic head in said memory as second and third detected data, when the magnetic head is moved according to the added and subtracted secondary control pattern data, respectively;

means for comparing respective discrete segments of said first detected data, said second detected data and said third detected data to identify the maximum segments thereof; and means for replacing discrete segments of said optimum control pattern data only with discrete segments of said secondary control pattern data which correspond to said maximum segments to update said optimum control pattern data.

5. The apparatus of claim 4, wherein the magnetic tape has a plurality of tracks and said means for comparing and said means for updating repeat their respective operations for each of the plurality of tracks.

6. A method for determining control pattern data for controlling a magnetic read head that is attached to a movable element to trace tracks written on an advancing magnetic tape, said method comprising the steps of:

(a) storing signals detected by the magnetic read head as first detected data when the movable element is controlled with a first control pattern data, (b) storing signals detected by said magnetic read head as a second detected data when the movable element is controlled with a second control pattern data wherein the second control pattern data differs from said first control pattern data by a positive constant, (c) storing signals detected by said magnetic read head as a third detected data when the movable element is controlled with a third control pattern data wherein the third control pattern data differs from said first control pattern data by a negative constant, (d) comparing respective, discrete segments of said first detected data, said second detected data and said third detected data to identify the maximum segments thereof; and (e) replacing discrete segments of said first control pattern data only with discrete segments of said second control pattern data or said third control pattern data which correspond to said maximum segments to update said first control pattern data.

7. The method of claim 6, wherein steps (a)–(e) are iterated using updated first control pattern data of step (e) as the first control pattern data in step (a).

8. An apparatus that determines control pattern data for controlling a magnetic read head that is attached to a movable element to trace tracks written on an advancing magnetic tape, said apparatus comprising:

a first memory storing signals detected by the magnetic read head as first detected data when the movable element is controlled with a first control pattern data;

a second memory storing signals detected by said magnetic read head as a second and a third detected data when the movable element is controlled with a second and a third control pattern data, respectively wherein the second and third control pattern data differ from said first control pattern data at each point by a positive and negative constant, respectively;

a comparator, comparing respective, discrete segments of said first, second a third detected data identify the maximum segments thereof; and a replacer, replacing discrete segments of said first control pattern data only with discrete segments of said second or third control pattern data which correspond to said maximum segments.

9. The apparatus of claim 8 wherein said movable element includes a piezoelectric element.

10. The apparatus of claim 8, wherein the magnetic tape has a plurality of tracks and the comparator and the updator repeat their respective operations for each of the plurality of tracks.

11. The apparatus of claim 8, further comprising an adder adding a constant to said first control pattern data to generate said second control pattern data.

12. The apparatus of claim 8, further comprising a subtractor subtracting a constant from said first control pattern data to generate said third control pattern data.

* * * * *